(12) United States Patent
Sase et al.

(10) Patent No.: US 7,088,594 B2
(45) Date of Patent: Aug. 8, 2006

(54) RESONANT CONVERTER AND CONTROL METHOD THEREOF

(75) Inventors: Takashi Sase, Hitachi (JP); Akihiko Kanouda, Hitachinaka (JP); Tetsuya Nagayama, Hitachi (JP); Tadahiko Hashimoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/984,846

(22) Filed: Nov. 10, 2004

(65) Prior Publication Data

US 2005/0099827 A1    May 12, 2005

(30) Foreign Application Priority Data

Nov. 11, 2003  (JP)  ............................. 2003-380846

(51) Int. Cl.
*H02M 3/335* (2006.01)
(52) U.S. Cl. ...................................... 363/16
(58) Field of Classification Search .................. 363/16, 363/15, 131
See application file for complete search history.

(56) References Cited

U.S. PATENT DOCUMENTS 3,743,919 A * 7/1973 Bingley ....................... 363/160

6,949,915 B1 * 9/2005 Stanley ....................... 323/207

FOREIGN PATENT DOCUMENTS

JP    2002-247854    8/2002

OTHER PUBLICATIONS

Multioutput Current-Mode Resonant Converter Using MAGAMP Control, Switching Power Supply System Symposium, 2002, Japan Management Association, pp. C6-2-1 to C6-2-10).

* cited by examiner

*Primary Examiner*—Shawn Riley
(74) *Attorney, Agent, or Firm*—Crowell & Moring

(57) ABSTRACT

A resonant converter which can realize its easy design, eliminate the need for its adjustment, realize reliable soft switching operation, and increase an efficiency. A driver DRV of a main switching device uses a PLL circuit PLL to apply frequency tracking control in such a manner that a driving frequency fsw is made to track a resonant frequency fr (or 1/N thereof, N being an odd number) and that the phase of the driving frequency fsw leads the current zero phase of the resonant frequency fr always by a desired time. As a result, such an optimum condition can be kept that the main switching device is triggered immediately before the zero-cross point of a resonant current. Thus the resonant converter which can always satisfy the optimum operational conditions, realize soft switching operation, and increase an efficiency can be realized with an easy design and a manufacturing adjustment-free arrangement.

20 Claims, 15 Drawing Sheets

GD3 or GD4

RESONANT CONVERTER AND CONTROL METHOD THEREOF

BACKGROUND OF THE INVENTION

The present invention relates to an improvement in a resonant converter which converts a direct current to an alternating current as an alternating current output by a semiconductor switching device, and supplies the alternating current output to a primary side of a transformer via a resonance circuit to convert an alternating current flowing through a secondary side of the transformer into a direct current.

A DC-DC converter has been widely used as an isolated power supply for the process input/output device of a computer control system or as a multioutput DC power supply for an information and communication equipment, electronic equipment and so on. One of types of such DC-DC converters is a resonant converter, which is disclosed, for example, in JP-A-2002-247854 or in "Multioutput Current-Mode Resonant Converter Using MAGAMP Control", Switching Power Supply System Symposium 2002, Japan Management Association, (C6-2-1 to C6-2-10) (see C6-2-8 for its entirety and objects) (which will be referred to as Literature 1, hereinafter). That is, the resonant converter basically includes a main switching device (DC-AC converter), a resonance circuit, a transformer, and a rectifier (AC-DC converter). And a smoothly varying current is obtained by the resonance circuit, and a switching loss is reduced by the soft switching of the switching device in the vicinity of a zero voltage and a zero current thereof, thus realizing a high efficiency and low noise.

SUMMARY OF THE INVENTION

As disclosed in Literature 1, the above resonant converter is difficult in the design and computation of an operating frequency because a load resistance varies according to an output condition. A resonant frequency also varies according to not only the load variation but also variations in the characteristics between the components of the resonance circuit. In order to realize the soft switching operation of the resonant converter, a driving frequency fsw of the main switching device is required to be kept at a resonant frequency fr of the resonance circuit or higher. For this reason, circuit design becomes troublesome due to the aforementioned load variation or variations in the resonance circuit components.

It is therefore an object of the present invention to provide a resonant converter which can realize easy design and reliable soft switching operation even in the presence of variations in characteristics between the components of a resonance circuit.

Another object of the present invention is to realize a control method of a resonant converter which can attain continuous soft switching operation even in the presence of a load variation or variations in characteristics between the components of a resonance circuit.

In an aspect of the present invention, the output frequency fsw of a driving section for driving a main switching device is made to track the resonant frequency fr of the resonance circuit or a frequency corresponding to 1/(odd number) thereof.

In an embodiment of the aspect of the present invention, the output frequency fsw of the driving section is made to track the resonant frequency fr under control of frequency tracking using a PLL (Phase Locked Loop) circuit.

In another aspect of the present invention, the output frequency fsw of the driving section for driving the main switching device is made to track the resonant frequency fr of the resonance circuit or a frequency corresponding to 1/(odd number) thereof, and the driving section is designed to generate an output signal which leads the zero-cross point of a resonant current of the resonance circuit in phase.

In accordance with the present invention, there is provided a resonant converter which can realize easy design and reliable soft switching operation even in the presence of a load variation or variations in characteristics between the components of a resonance circuit.

In the other aspect of the present invention, there is provided a control method for a resonant converter which can realize continuous soft switching operation even in the presence of a load variation or variations in characteristics between the components of a resonance circuit.

Other objects, features and advantages of the invention will become apparent from the following description of the embodiments of the invention taken in conjunction with the accompanying drawings.

DESCRIPTION OF THE EMBODIMENTS

Figure 1:
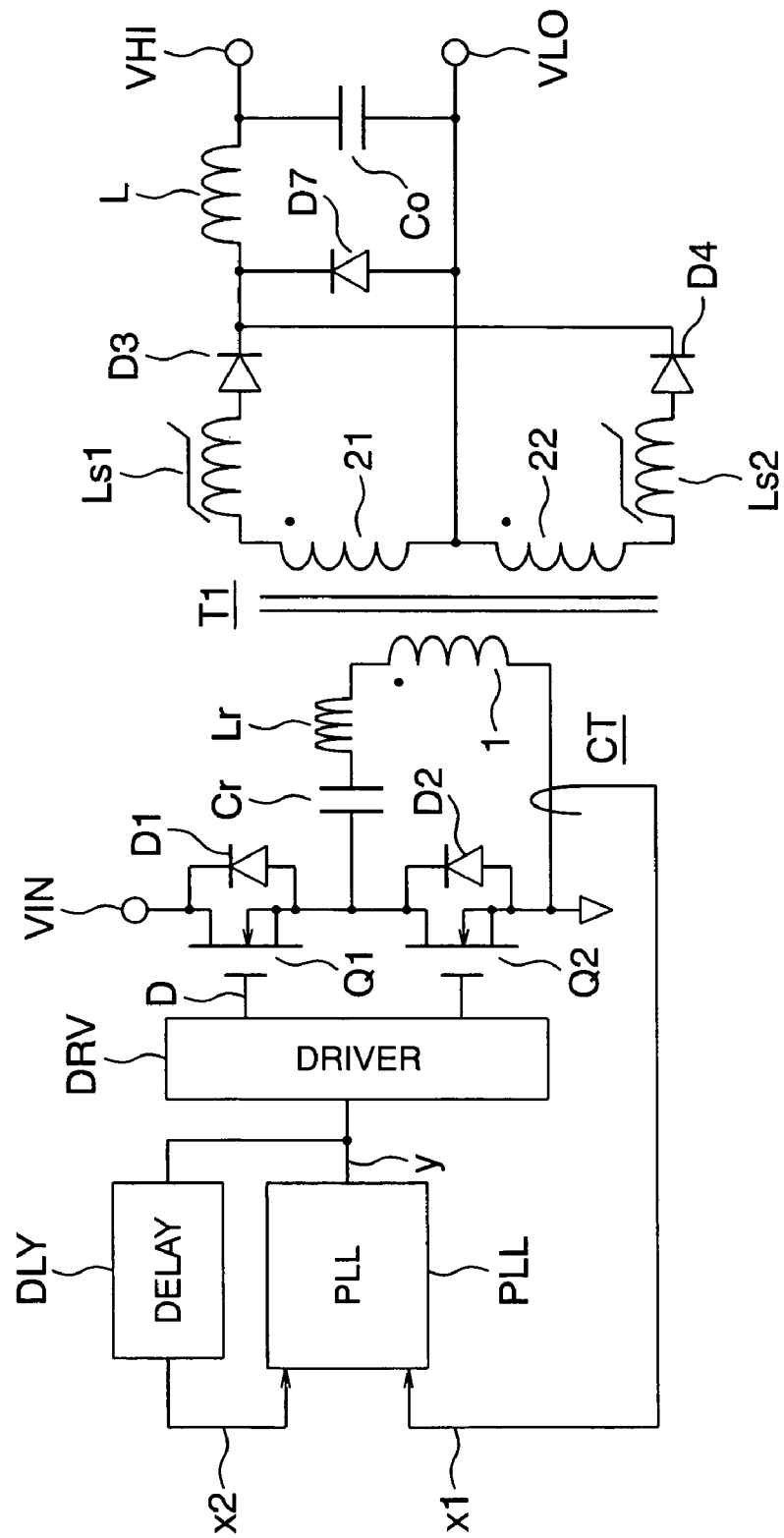
FIG. 1 shows a circuit arrangement of a resonant converter in accordance with a first embodiment of the present invention.

FIG. 1 is a circuit arrangement of a resonant converter in accordance with a first embodiment of the present invention. In FIG. 1, reference symbol VIN denotes an input voltage supply terminal, symbol VHI denotes a high voltage output terminal, and VLO denotes a low voltage output terminal. A high side power MOS FET Q1 is connected to the input voltage supply terminal VIN, and a low side power MOS FET Q2 is grounded. Connected between a midpoint of the power MOS FETs Q1, Q2 and the ground voltage are an LC resonance circuit of a capacitor Cr and an inductor Lr, a primary winding 1 of a transformer T1, and the primary winding 1 of a current transformer CT, which are connected in series. An output of the current transformer CT is connected to an input line x1 as one input of a PLL (Phase Locked Loop) circuit PLL. An output line y of the PLL circuit is connected via a driver DRV to gates of the power MOS FETs Q1 and Q2, and also connected via a delay element DLY to an input line x2 of the PLL circuit PLL as the other input. The power MOS FETs Q1 and Q2 including body diodes D1 and D2 respectively are driven in mutually opposite phases, and are alternately turned on with a duty of 50%.

A saturable reactor Ls1 and a diode D3 are connected to one secondary winding 21 of the transformer T1, while a saturable reactor Ls2 and a diode D4 are connected to the other secondary winding 22. Cathodes of the diodes D3 and D4 are commonly connected to a cathode of a diode D7. And an anode of the diode D7 is connected to a center tap of the two secondary windings 21 and 22 of the transformer T1 and also to the low voltage output terminal VLO of the secondary side. A smoothing filter having an inductor L and a capacitor Co is connected between the cathode of the diode D7 and the low voltage output terminal VLO, and an output of the filter is supplied to the high voltage output terminal VHI.

In this circuit arrangement, the power MOS FETs Q1 and Q2 are driven by the driver DRV to convert a direct current of the input voltage supply terminal VIN to an alternating current and to supply the alternating current to the primary winding 1 of the transformer T1 via the resonance circuit (Cr, Lr). An alternating current obtained at the secondary windings 21 and 22 of the transformer T1 is converted to a direct current and then output controllably by a combination of the saturable reactors Ls1 and Ls2 and the diodes D3 and D4. That is, the above circuit arrangement forms a resonant type DC-DC converter. In other words, the primary side circuit of the transformer T1 forms a two-transistor resonance circuit, and the secondary side circuit thereof forms an isolated power supply of a DC-DC conversion type having a magamp control circuit provided with a center tap.

Explanation will next be made as to the circuit operation of FIG. 1. In the usual operation of the resonant converter, when the power MOS FET Q1 is first turned on (the power MOS FET Q2 in its off state), a direct voltage is applied from the input voltage supply terminal VIN to the resonance circuit of the capacitor Cr and the inductor Lr, so that a positive resonant current starts to flow through the resonance circuit. A period, during which the positive resonant current flows, corresponds to ½ of the reciprocal of the resonant frequency fr of the resonance circuit (half period). In the next half period, when the power MOS FET Q2 is turned on (power MOS FET Q1 is turned off), a negative resonant current starts to flow through the resonance circuit. For this reason, in the resonant type converter, it is necessary to make the output frequency fsw for driving of the power MOS FETs Q1 and Q2 coincide with the resonant frequency fr. Assuming in this example that the capacitor Cr of the resonance circuit has a capacity Cr and the inductor Lr of the resonance circuit has an inductance Lr, then the resonant frequency fr of the resonance circuit is given by $1/2\pi\sqrt{(Lr \cdot Cr)}$. Thus, when the output frequency fsw for driving the power MOS FETs Q1 and Q2 is determined, the values of the inductance Lr and the capacity Cr are determined by substituting the determined output frequency for fr. Soft switching operation is secured usually by finding such values under conditions, $fsw \geq fr$. In this case, it is required to consider the value of the inductance Lr including the value of a leakage inductance of the transformer T1. When the value of the leakage inductance is smaller than the value of the inductance Lr to be used, however, the leakage inductance of the transformer T1 is negligible.

The point of realization of reliable soft switching operation of the resonant converter is that the relation $fsw \geq fr$ is always satisfied between the output frequency fsw and the resonant frequency fr. As mentioned above, the resonant frequency fr of the resonance circuit remarkably varies with a load variation (including a temperature variation) or variations in characteristics of the components of the resonance circuit. Thus the requirement $fsw \geq fr$ is required to be met even when the resonant frequency fr varies. To this end, the principal object is placed on meeting the requirement $fsw \geq fr$, and the frequency tracking control system based on the PLL circuit is employed. When the converter is first turned on, one input line x1 of the PLL circuit PLL has no signal. As a result, the oscillation frequency of a variable oscillator within the PLL circuit is output from the output line y of the PLL circuit PLL as the initial value of the output frequency fsw to drive the power MOS FETs Q1 and Q2 via the driver DRV. In this case, since it is necessary to meet the requirement $fsw \geq fr$ even in the no-signal duration, the initial oscillation frequency of the variable oscillator is previously set at a frequency (maximum frequency to be explained later) higher than the value fr. When the converter is operated in this way, a resonant current starts to flow through the resonance circuit, and the resonant current is detected by the current transformer CT. When zero-phase information about the detected resonant current is applied to one input line x1 of the PLL circuit PLL, the PLL circuit modifies the oscillation frequency of the variable oscillator according to the resonant frequency fr in such a manner that the output frequency fsw is equal to the resonant frequency fr. The function of the PLL circuit also acts to make equal not only the frequency but also the phase. When these two frequencies become equal to each other and the phases are also made equal, however, the converter is influenced by the body diodes D1 and D2 and output capacities (not shown) of the power MOS FETs Q1 and Q2, thus making it difficult to realize the reliable soft switching operation. To avoid this and realize the reliable soft switching operation, it is necessary to set the phase relation between two frequencies as shown by operational waveforms in FIG. 2.

Figure 2:
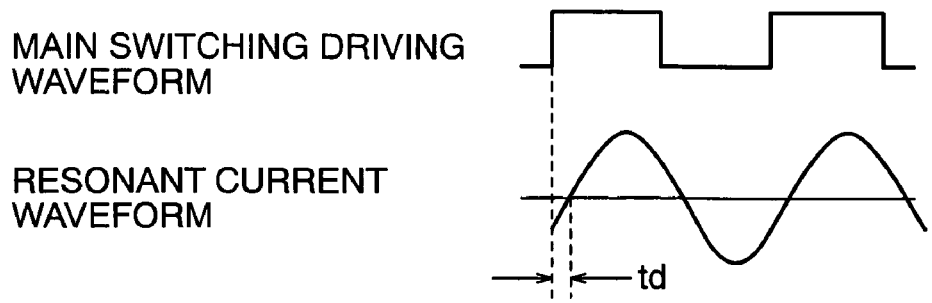
FIG. 2 shows a waveform of a driving current of a main switching device and a waveform of a resonant current in the embodiment of FIG. 1, showing a phase relationship therebetween.

FIG. 2 shows a waveform of a current for driving a main switching device a waveform of a resonant current in accordance with a first embodiment of the present invention, showing a phase relation therebetween. In the illustrated example, the waveform of the current for driving the power MOS FET Q1 (main switch) leads the waveform of the resonant current of the current transformer CT having a zero phase by a phase td. To realize this, a delay element DLY is provided in a feedback loop extended from the output line y of the PLL circuit PLL to the other input line x2. This results in that the drive waveform of the main switching device lead the waveform of the resonant current by the phase td and a phase relation necessary for the reliable soft switching operation can be realized.

Figure 3:
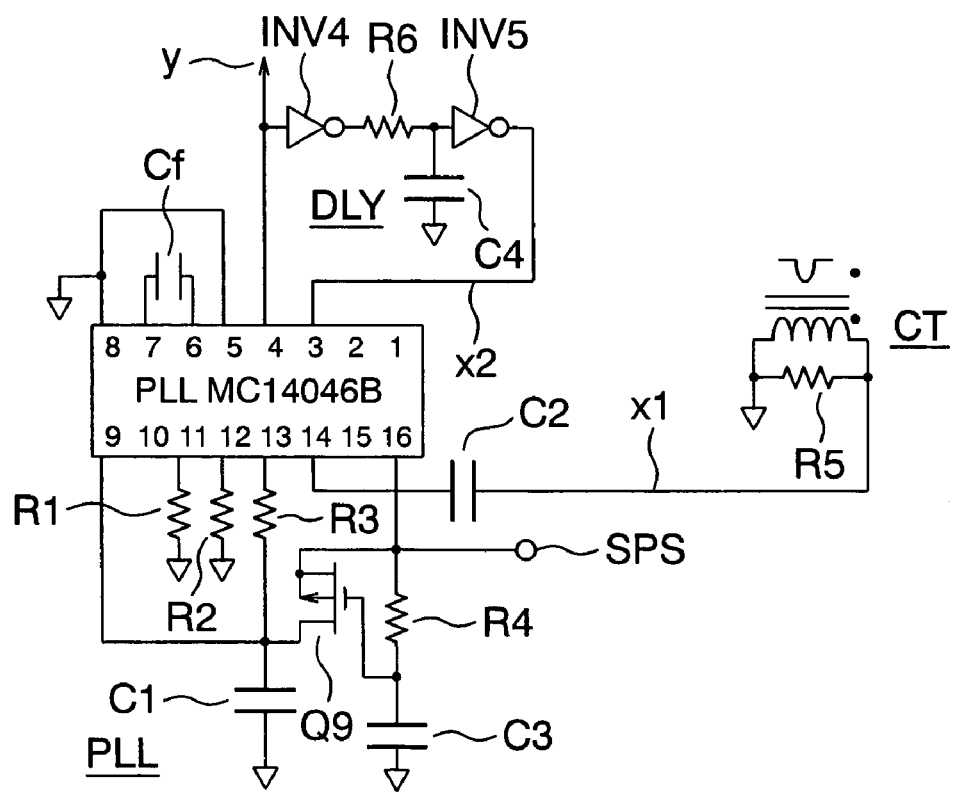
FIG. 3 is a detailed circuit diagram of the embodiment of FIG. 1 around a PLL circuit.

FIG. 3 is a specific example of a circuit arrangement of the embodiment of FIG. 1 around the PLL circuit. In FIG. 3, MC14046B manufactured by Motorola Inc. is used as the PLL circuit. The minimum oscillation frequency fmin of the variable oscillator is determined by a resistor R2 and a timing capacitor Cf, and the variable frequency range (fmax to fmin) of the variable oscillator is determined by a resistor R1 and the timing capacitor Cf. A loop filter is composed of a resistor R3 and a capacitor C1. As mentioned above, in the power supply start mode (no-signal mode), the oscillation frequency of the variable oscillator in the PLL circuit is set to start oscillating with its maximum frequency fmax. For this reason, in the start mode, a voltage received at a power supply terminal SPS as well as a circuit having a MOS transistor Q9, a resistor R4, and a capacitor C3 are used to set the output (control input of the variable oscillator) of the loop filter forcibly at the power voltage. Next, the delay element DLY is composed of two inverters INV1 and INV2, a resistor R6, and a capacitor C4; and the delay time td is set by a time constant of the resistor R6 and the capacitor C4 and by the logic threshold voltage of the inverter INV2. Positive and negative resonant currents of the resonance circuit are transmitted to the secondary side of the current transformer CT via the current transformer CT, and the resonant currents are converted to positive and negative voltages via a resistor R5. These converted voltages are input to the PLL circuit via a capacitor C2 for level conversion.

Although the resonant frequency fr is designed to be the same as the output frequency fsw of the variable oscillator within the PLL circuit in the present embodiment, the variable oscillator within the PLL circuit may oscillate if necessary at an oscillation frequency corresponding to M times the resonant. In this case, a feedback loop extended from the output of the PLL circuit via a 1/M divider circuit to the delay element is formed. Thus, when a drive signal to the driver DRV is extracted from the midpoint of the divider circuit and the delay element, PLL operation can be achieved in a similar manner to the above.

As has been mentioned above, the achievement of the reliable soft switching operation leads to reduction of the switching loss of the power MOS FETs Q1 and Q2, thus realizing an increased efficiency. Further, with regard to variations in characteristics between the components of the resonance circuit, the driving frequency fsw of the power MOS FETs Q1 and Q2 is made to track the resonant frequency fr determined by the time constant of used components using the PLL circuit. As a result, manufacturing adjustment can be freely made and design and adjusting cost can be reduced.

Explanation will then be made as to the operation of obtaining a direct output voltage at the secondary side circuit of the transformer T1. Referring back to FIG. 1, a voltage induced at the secondary winding 21 is applied as an energy via the saturable reactor Ls1 and the diode D3 to a smoothing filter of the inductor L and the capacitor Co. Similarly, a voltage induced at the secondary winding 22 is applied to the smoothing filter via the saturable reactor Ls2 and the diode D4. These saturable reactors Ls1 and Ls2 act as magnetic amplifiers well known so far, and can considered to perform the PWM (Pulse Width Modulation) control of the magnetic circuit. More specifically, when the saturable reactor Ls1 or Ls2 is in a reset period and in an unsaturation period, the reactor is considered to be in the off period of the PWM pulse. When the reactor is in a saturation period, the reactor is considered to be in the on period of the PWM pulse and the diode D3 or D4 is correspondingly conducted. When the saturable reactor Ls1 or Ls2 is in the unsaturation or reset period, the energy of the smoothing filter and a load (not shown) is circulated through the diode D7, like the off period of the PWM pulse. In this manner, an output voltage Vo is eventually obtained between the output terminals VHI and VLO.

Figure 4:
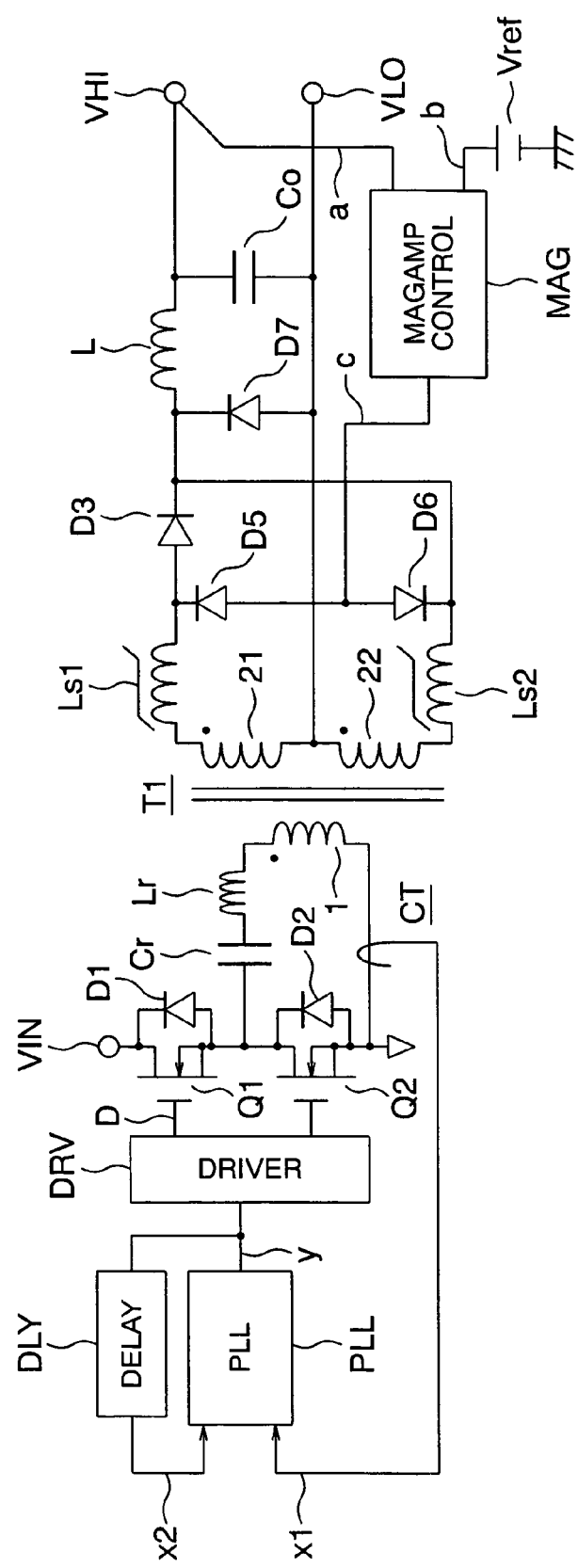
FIG. 4 is a circuit arrangement of a resonant converter in accordance with a second embodiment of the present invention, corresponding to FIG. 1 but a magamp control circuit is added to the resonant converter of FIG. 1.

FIG. 4 is a circuit arrangement of a resonant converter in accordance with a second embodiment of the present invention, wherein a magamp control circuit is added to the resonant converter of FIG. 1. FIG. 4 is different from FIG. 1 in that resetting diodes D5, D6, a magamp control circuit MAG, and a reference voltage Vref are added for control of the saturable reactors Ls1 and Ls2. The added circuit acts to compare the output voltage and the reference voltage Vref, and perform negative feedback control over the magamp control circuit MAG in such a manner that the output voltage is equal to the reference voltage Vref. When the output voltage is higher (lower) than the reference voltage Vref, the output voltage is fed back to the magamp control circuit MAG to decrease (increase) the output, whereby a desired output voltage can be obtained.

Figure 5:
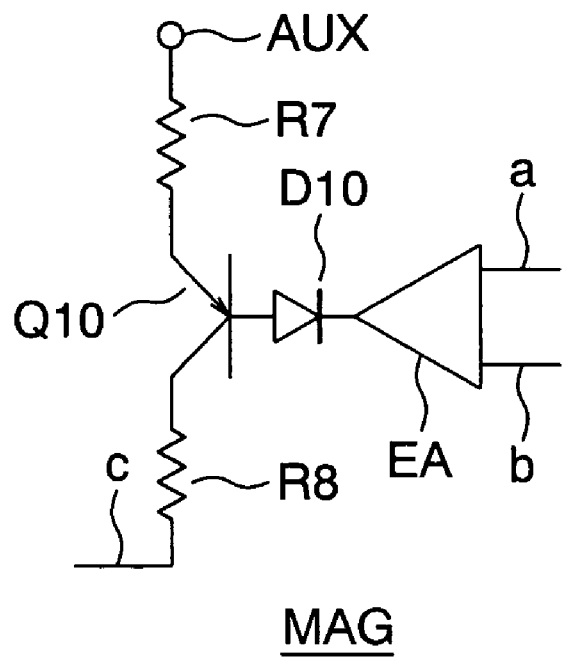
FIG. 5 is a detailed circuit diagram of the magamp control circuit used in the embodiment of FIG. 4.

FIG. 5 is a specific circuit diagram of the magamp control circuit used in the embodiment of FIG. 4. The magamp control circuit MAG is composed of an error amplifier EA, a diode D10, a bipolar transistor Q10, and two resistors 7 and 8. A voltage at the high voltage output terminal VHI or an output voltage of an auxiliary power supply is supplied to a power terminal AUX. In FIG. 5, if a voltage (output voltage) on an input line a is lower than a voltage (reference voltage) on an input line b, then the bipolar transistor Q10 operates to cutoff. As a result, a resets current becomes small, a saturable reactor spreads the saturation period, and a pulse width passing through the diode D3 or D4 is controlled to be expanded. If the voltage (output voltage) on the input line a is higher than the voltage (reference voltage) on the input line b, to the contrary, then the bipolar transistor Q10 acts to be shifted to such a direction as to increase its conduction current. Thus, the reset current becomes large, the saturable reactor expands the reset period (including unsaturation period), and the pulse width passing through the diode D3 or D4 is controlled in such a direction as to be narrowed.

Figure 6:
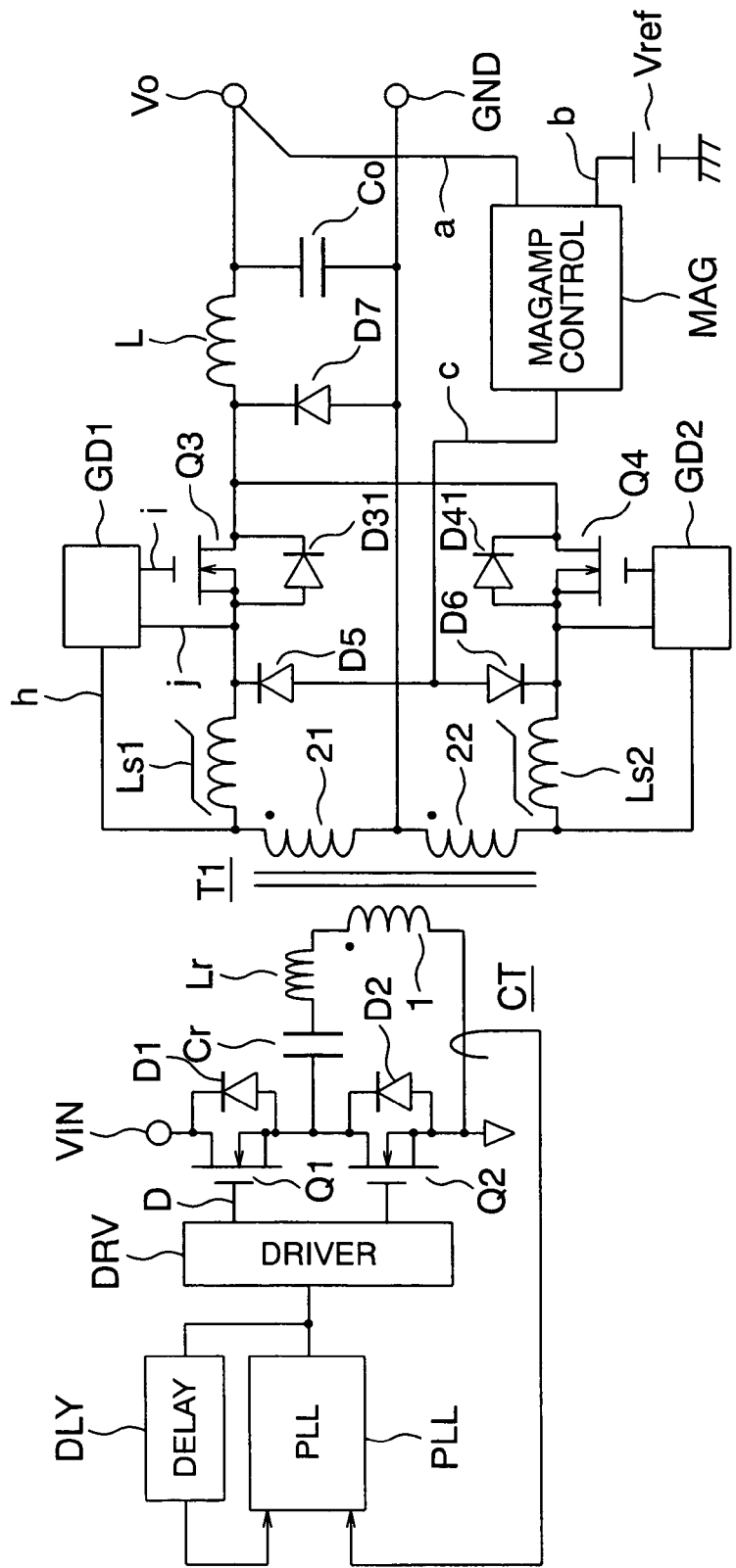
FIG. 6 is a circuit arrangement of a resonant converter in accordance with a third embodiment of the present invention.

FIG. 6 is a circuit arrangement of a resonant converter in accordance with a third embodiment of the present invention. The embodiment of FIG. 6 is different from that of FIG. 4 in that the diodes D3 and D4 are replaced by power MOS FETs Q3 and Q4. Since the above replacement enables the power MOS FET to have a low on-resistance, the loss can be reduced and the efficiency can be increased when compared with the use of the diodes. Diodes D31 and D41 in FIG. 6 are body diodes for the power MOS FETs Q3 and Q4. The power MOS FETs Q3 and Q4 are driven by gate driving circuit GD1 and GD2 respectively.

Figure 7:
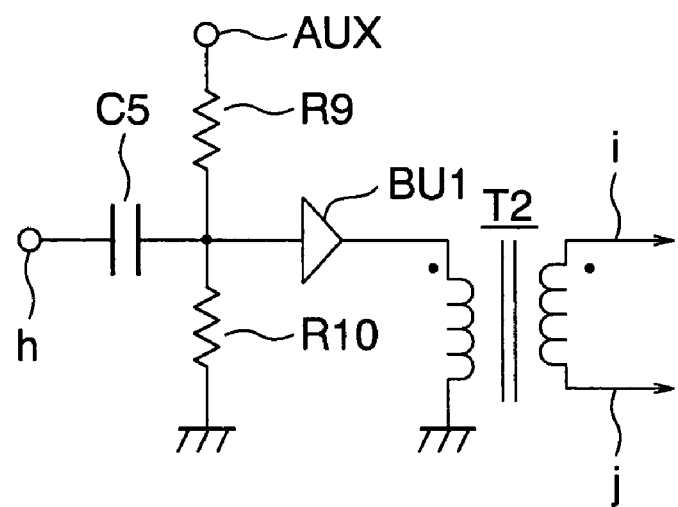
FIG. 7 is a detailed circuit diagram of a gate driving apparatus of a power MOS FET used in the embodiment of FIG. 6.

FIG. 7 is a specific example of a circuit arrangement of the gate driving apparatus of a power MOS FET used in the embodiment of FIG. 6. In FIG. 7, a signal extracted from a connection between the saturable reactor Ls1 or Ls2 and the transformer is used as an input to drive a transformer T2 via a level shift circuit of a capacitor C5 and two resistors R9 and R10 and via a buffer circuit BU1. And a voltage induced on the secondary winding of the transformer T2 is used to drive the gate of the power MOS FET Q3 or Q4.

Figure 8:
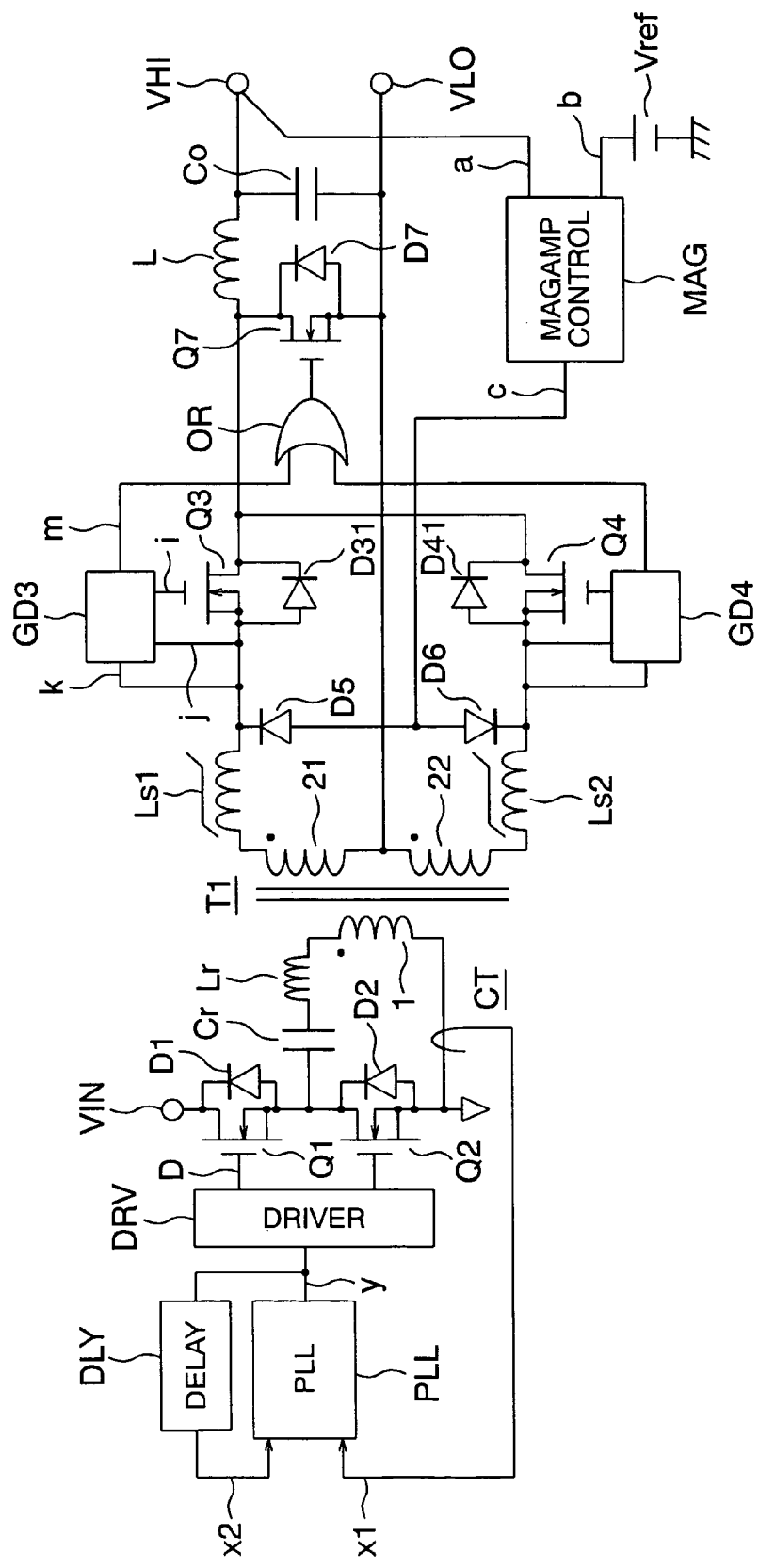
FIG. 8 is a circuit arrangement of a resonant converter in accordance with a fourth embodiment of the present invention.

FIG. 8 is a circuit arrangement of a resonant converter in accordance with a fourth embodiment of the present invention. In FIG. 8, similarly to FIG. 6, the diodes D3 and D4 in FIG. 4 are replaced by the power MOS FETs Q3 and Q4 and the diode D7 in FIG. 6 is replaced by a power MOS FET Q7. As a result, since the forward loss of the diode D7 can be reduce, an efficiency can be further increased. Gate driving apparatuses GD3 and GD4 and an OR gate OR are used to drive the gates of the power MOS FETs Q3, Q4, and Q7 used in this example.

Figure 9:
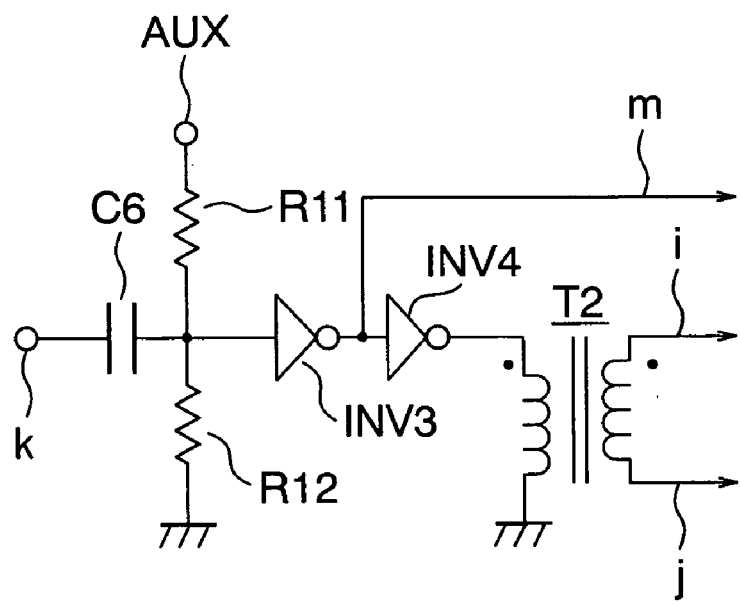
FIG. 9 is a detailed circuit diagram of a gate driving apparatus of a power MOS FET used in the embodiment of FIG. 8.

FIG. 9 is a specific example of a circuit arrangement of the gate driving apparatus used in the embodiment of FIG. 8. Differences between the embodiments of FIGS. 9 and 7 are two points. The first point is that the buffer circuit BU1 in FIG. 7 is replaced by inverters INV3 and INV4 and an output at an intermediate connection point between the inverters is supplied to the OR gate OR in FIG. 8. The next different point is that an input line k to the gate driving circuit GD3 or GD4 is extracted from the cathode of diode D5 or D6. As a result, the power MOS FETs Q3 and Q4 are turned on in the saturation period of the saturable reactor and are turned off in the off period of the power MOS FETs Q3 and Q4.

Figure 10:
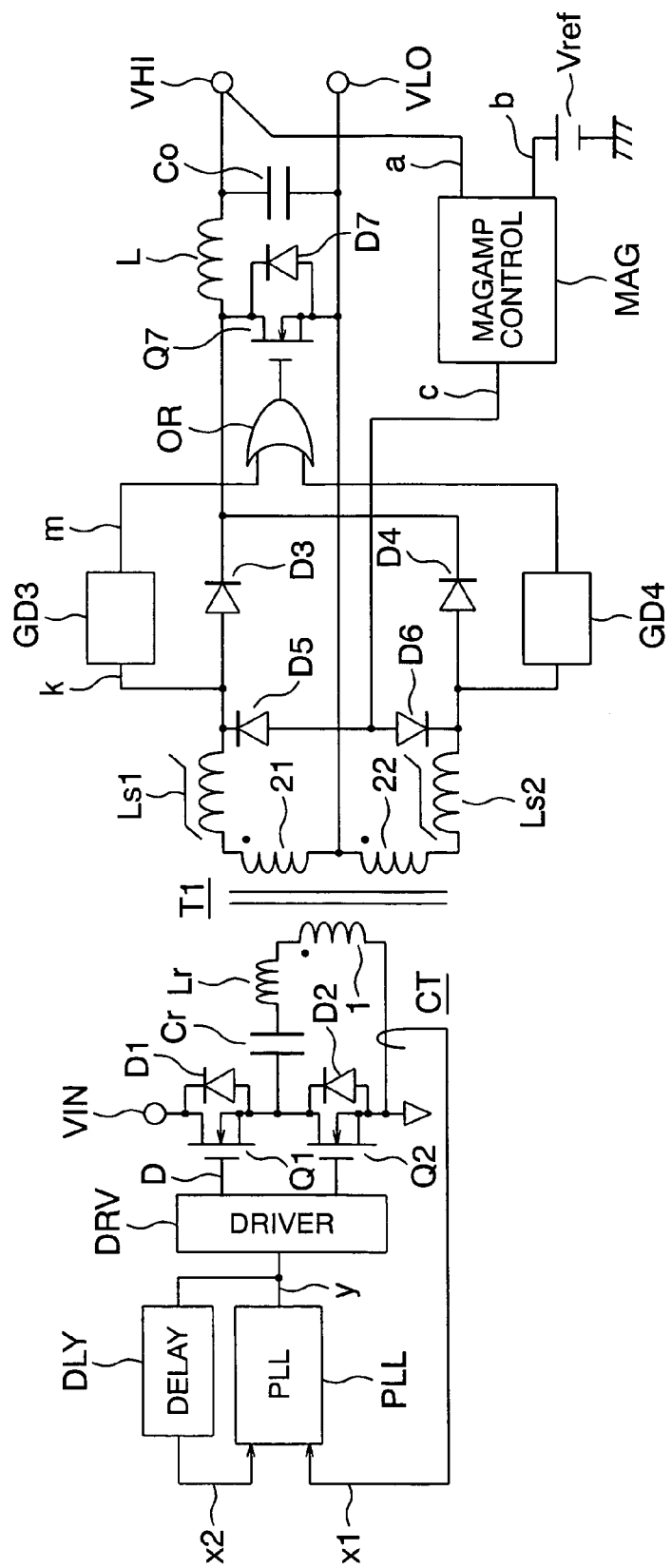
FIG. 10 is a circuit arrangement of a resonant converter in accordance with a fifth embodiment of the present invention.

FIG. 10 is a circuit arrangement of a resonant converter in accordance with a fifth embodiment of the present invention. In FIG. 10, the diodes D3 and D4 are used as they are in the embodiment of FIG. 4 and the diode D7 is replaced by a power MOS FET. In this arrangement, when an output voltage is as relatively high as, e.g., a level in a range of 5–12 volts and thus when the forward loss of a rectifier diode causes no serious problems, a circuit component cost or a loss can be reduced. In other words, the current of the inductor L in the no-load mode can be moved to its continuous mode, the overshoot of the output voltage can be avoided, and the need of a dummy load for suppressing a rise in the output voltage in the no-load state of a discontinuous mode when the free wheel, diode is employed can be eliminated. The effect can be similarly obtained even in the foregoing embodiments so long as the free wheel diode is replaced by the power MOS FET.

Figure 11:
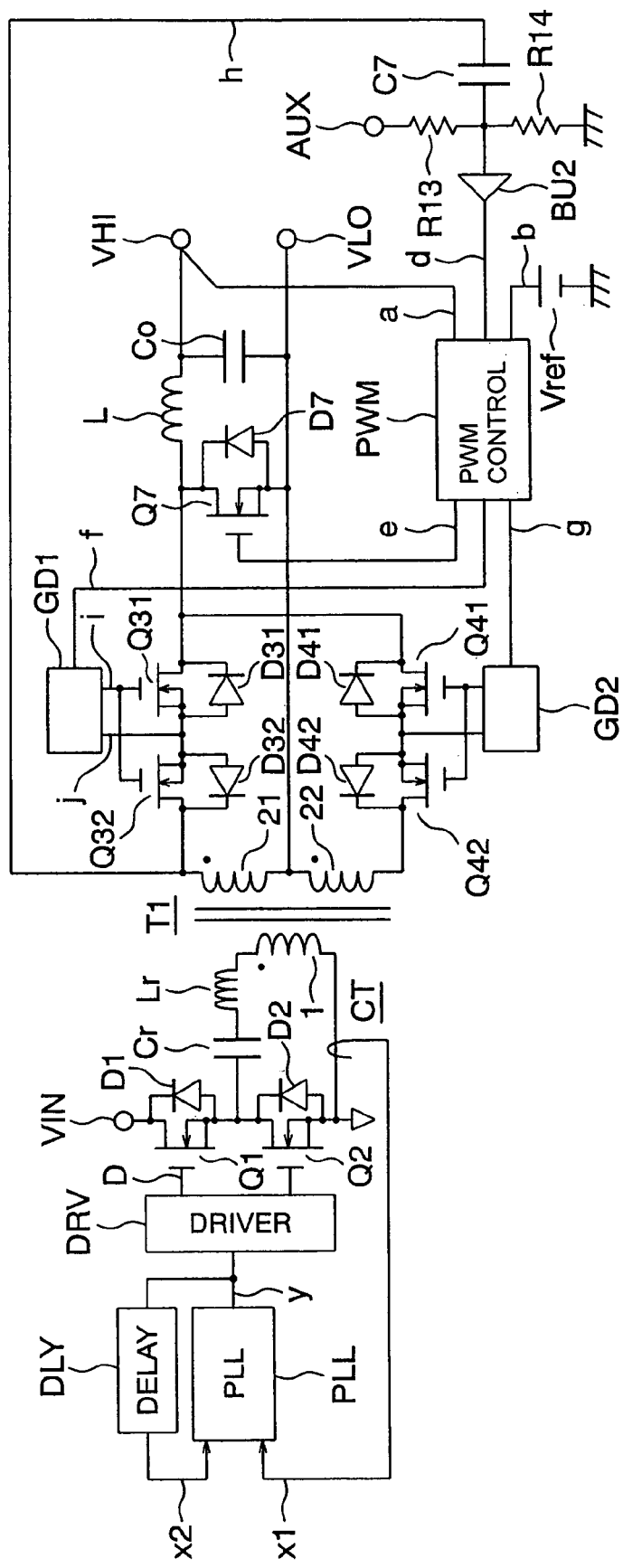
FIG. 11 is a circuit arrangement of a resonant converter in accordance with a sixth embodiment of the present invention, wherein a PWM control circuit of a synchronous rectification type is used in the secondary side of a transformer.

FIG. 11 is a circuit arrangement of a resonant converter in accordance with a sixth embodiment of the present invention, wherein a PWM control circuit of a synchronous rectification type is used in a secondary side of a transformer. Accordingly, a saturable reactor is not used in the secondary side of the transformer. The power MOS FET Q3 or Q4 for passing the voltage from the secondary winding of the transformer therethrough in the foregoing embodiments is replaced by two power MOS FETs Q31 and Q32 or Q41 and Q42. Since an arrangement of commonly connecting source electrodes of these two power MOS FETs is employed, a synchronous rectification function can be realized. As a result, these two power MOS FETs are controlled by the PWM control circuit, the gate driving apparatuses GD1 and GD2, and the reference voltage Vref.

Figure 12:
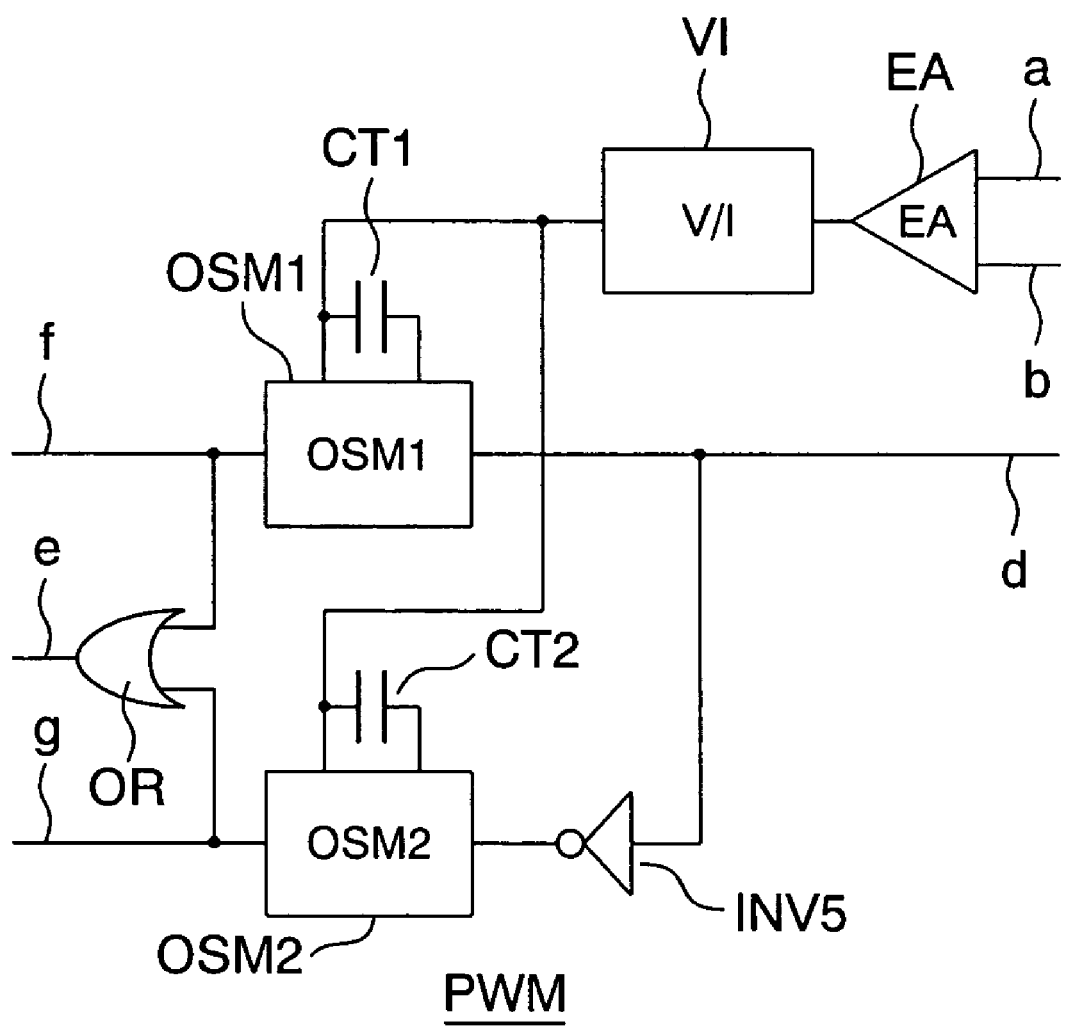
FIG. 12 is a detailed circuit diagram of the PWM control circuit used in the embodiment of FIG. 11.

FIG. 12 is a specific circuit arrangement of the PWM control circuit used in the embodiment of FIG. 11. A PWM control circuit PWM includes an error amplifier EA, a voltage-current conversion circuit VI, and one-shot multivibrator OSM1 or OSM2. The start timing signal of the one-shot multivibrator is extracted from one of polarity ends of the secondary winding 21 of the transformer T1 having a black spot applied thereto. The extracted signal is input to a signal line d via a level shift circuit having a capacitor C7 and two resistors R13 and R14. An error voltage between the reference voltage and the output voltage is amplified by the error amplifier EA, and the amplified voltage is converted to a current by the voltage-current conversion circuit VI. The converted current charges a capacitor CT1 or CT2. As a result, a PWM on-pulse is generated according to a relationship between the charging voltage and the operational threshold value of the one-shot multivibrator. The on-pulse thus generated is output as a signal on a signal line f or g to drive the power MOS FETs Q31, Q32, Q41, and Q42. The power MOS FET Q7 is driven by a signal appearing on a signal line e after the signals on the signal lines f and g are passed through the OR gate OR. Explanation has been made in connection with the example of FIG. 11 wherein the start timing signal of the one-shot multivibrator is extracted from one of the ends of the secondary winding 21 of the transformer T1 having the black spot applied thereto. However, the start timing signal of the one-shot multivibrator is not limited to the illustrated example.

In the present embodiment, in addition to the fact that a saturable reactor having a large capacity and components associated therewith can be omitted, an increased efficiency can be realized like the above cases.

The structure of the synchronous rectification circuit is not restricted to the circuit of FIG. 11 alone but a synchronous rectification system such as a current doubler circuit may be employed, exhibiting effects similar to the above cases.

Figure 13:
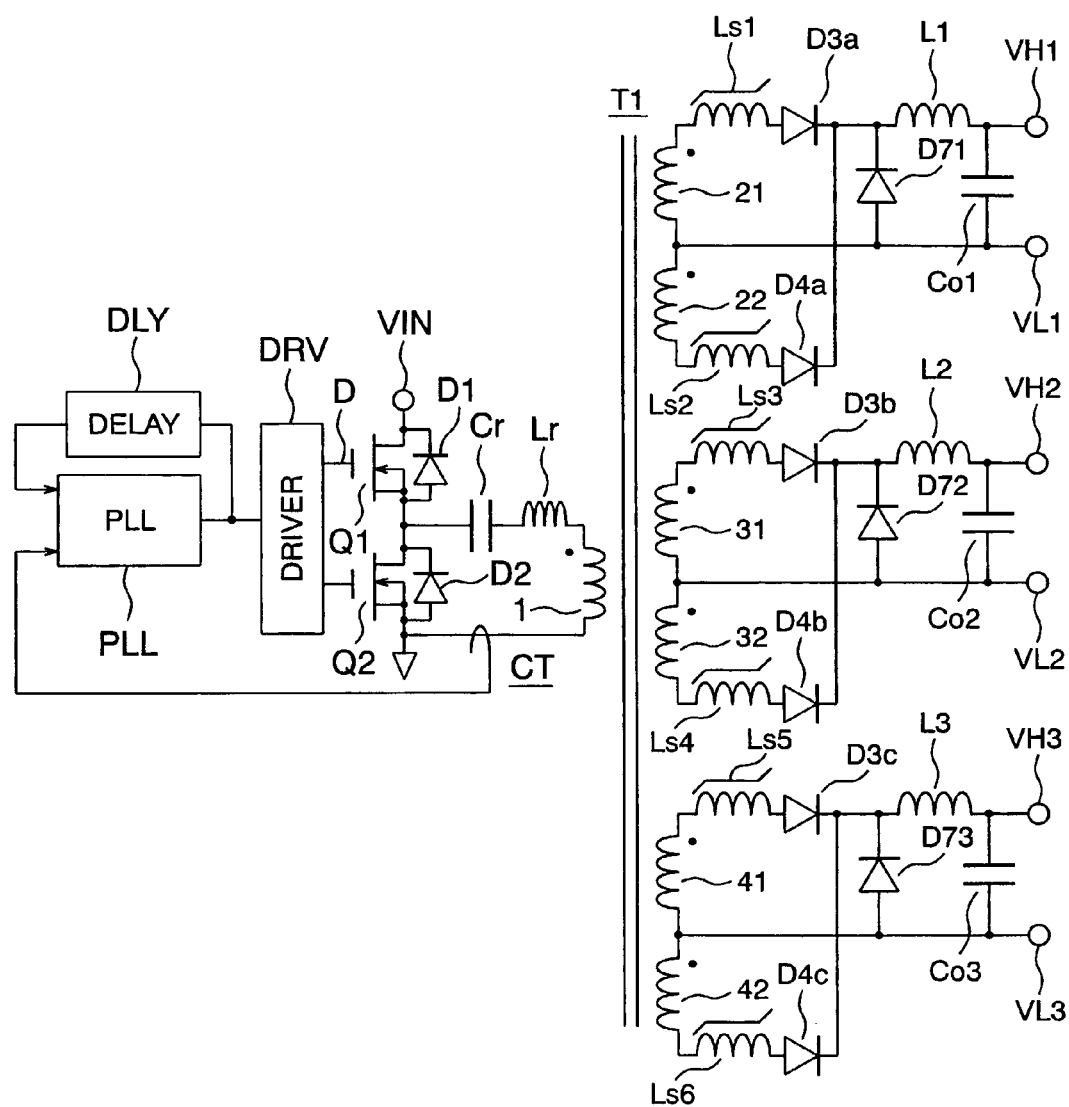
FIG. 13 is a circuit arrangement of a resonant converter in accordance with a seventh embodiment of the present invention, wherein the resonant converter is used in an isolated power supply of a multioutput type.

FIG. 13 is a circuit arrangement of a resonant converter in accordance with a seventh embodiment of the present invention, wherein the resonant converter is used in a multioutput isolated power supply. The primary side is a two-transistor resonance circuit using PLL control, and the secondary side is an individual magamp control circuit provided with a center tap. Since the circuit operation of the primary side is independent of the circuit operation of the secondary side, circuit design can be facilitated. Further, control interference between circuits at the secondary side can be made less. And even in the case of the multioutput power supply, in addition to the effects mentioned above, the power supply can advantageously have a smaller number of isolation locations between the primary and secondary sides. In the case of the multioutput arrangement, in addition, a combination of positive and negative output voltages can be easily made according to how to extract the ground voltage of the secondary side. In the example of FIG. 13, the saturable reactor is used in the secondary side of the transformer. However, as in FIG. 11, the saturable reactor is not used and a PWM control circuit of an individual synchronous rectification type provided with a center tap may be used, realizing effects similar to the above.

Figure 14:
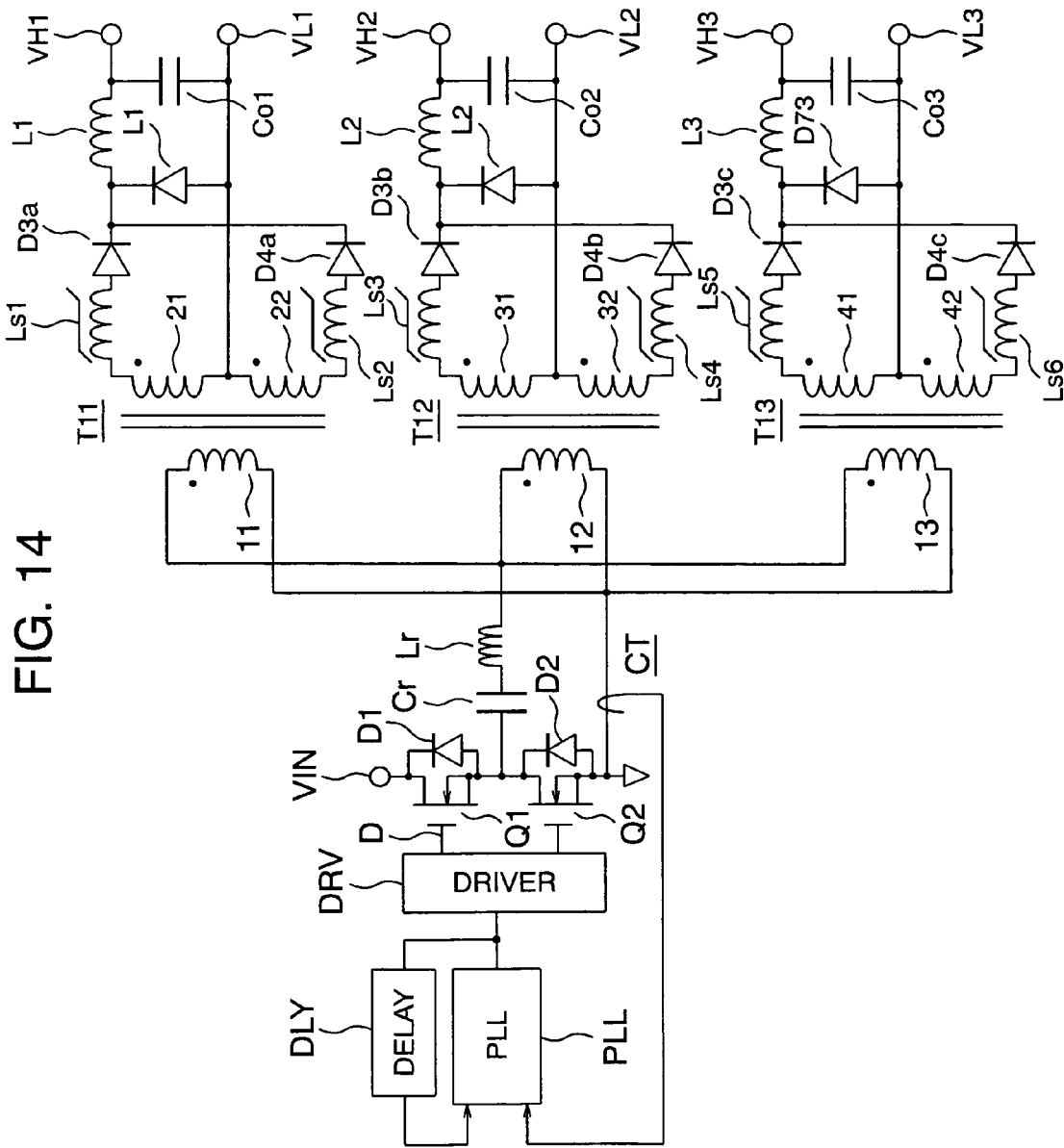
FIG. 14 is a circuit arrangement of a resonant converter in accordance with an eighth embodiment of the present invention, wherein a transformer is divided.

FIG. 14 is a circuit arrangement of a resonant converter in accordance with an eighth embodiment of the present invention, wherein the transformer is divided. In this drawing, the transformer is divided into three sections. Primary windings 11, 12 and 13 of transformers T11, T12 and T13 have each an identical coil turn number, and due to the presence of leakage inductances (not shown) of the transformers, it is expected to balance the transformers. Since the effect of the transformer division enables use of transformers having a small capacity, a small-size, flat type power supply can be easily constructed.

Figure 15:
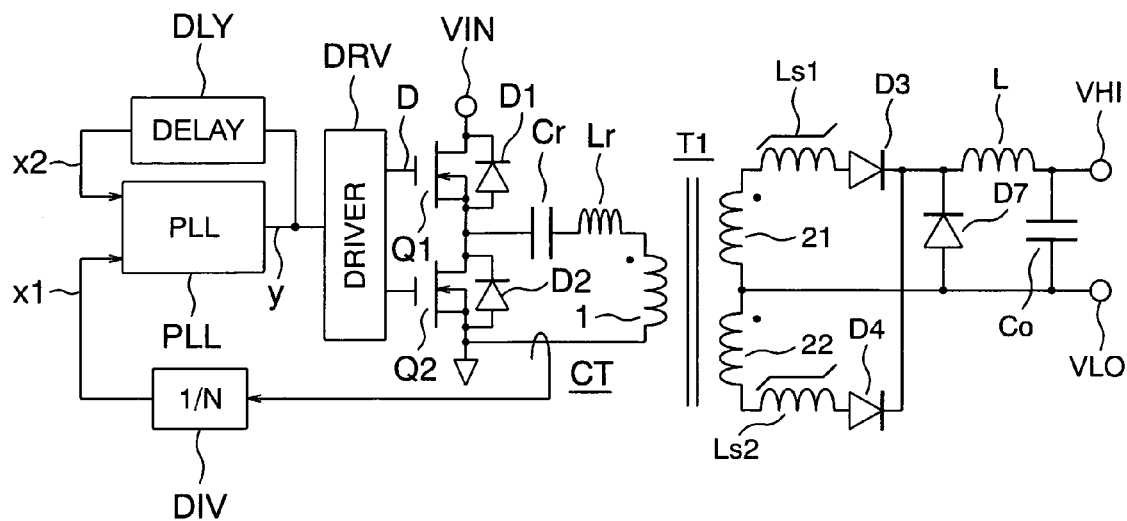
FIG. 15 is a circuit arrangement of a resonant converter in accordance with a ninth embodiment of the present invention, wherein an output frequency fsw is set at 1/N of a resonant frequency fr.

FIG. 15 is a specific example of a circuit arrangement of a resonant converter in accordance with a ninth embodiment of the present invention, wherein the driving frequency fsw is set at a value corresponding to 1/N of the resonant frequency fr. The power MOS FET is driven with the driving frequency fsw of the power MOS FET set at 1/N of the resonant frequency fr. The embodiment of FIG. 15 is different from that of FIG. 1 in that a 1/N divider DIV is inserted in a feedback loop extended from the current transformer CT to the PLL circuit PLL. In this case, as will be explained later, N is required to be one selected from odd numbers of 1, 3, 5, . . . .

Figure 16:
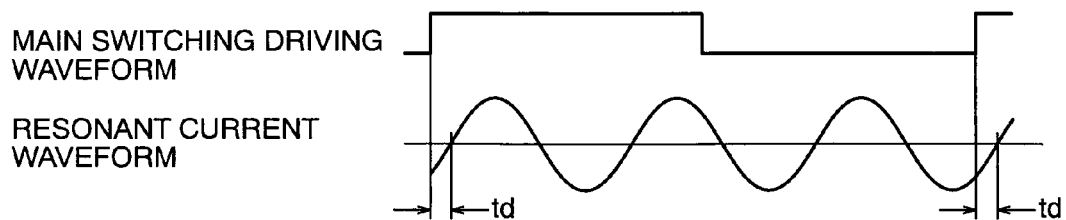
FIG. 16 shows a waveform of a driving current of a main switching device and a waveform of a resonant current in the embodiment of FIG. 15, showing a frequency/phase relationship therebetween.

FIG. 16 shows a waveform of a signal for driving the main switching device and a waveform of a resonant current thereof in the embodiment of FIG. 15, showing a frequency/phase relation therebetween. More specifically, the drawing shows operational waveforms when N=3. The reason why N is selected as an odd number, will be explained. When N=1, first, as shown in FIG. 2, the timing when the waveform of the signal for driving the main switching device is shifted to its ON state, is immediately before the sinusoidal wave of the resonant current is moved from negative to positive. The timing when the waveform of the signal for driving the main switching device is shifted to its OFF states is immediately before the sinusoidal wave of the resonant current is moved from positive to negative. When N is increased with this relation kept, N can take one of odd numbers of 1, 3, 5 . . . .

According to the present embodiment, since the driving frequency fsw of the power MOS FET has a value corresponding to 1/N (odd number) of the resonant frequency fr, a switching loss such as the recovery loss of the body diode of the power MOS FET can be advantageously reduced.

Figure 17:
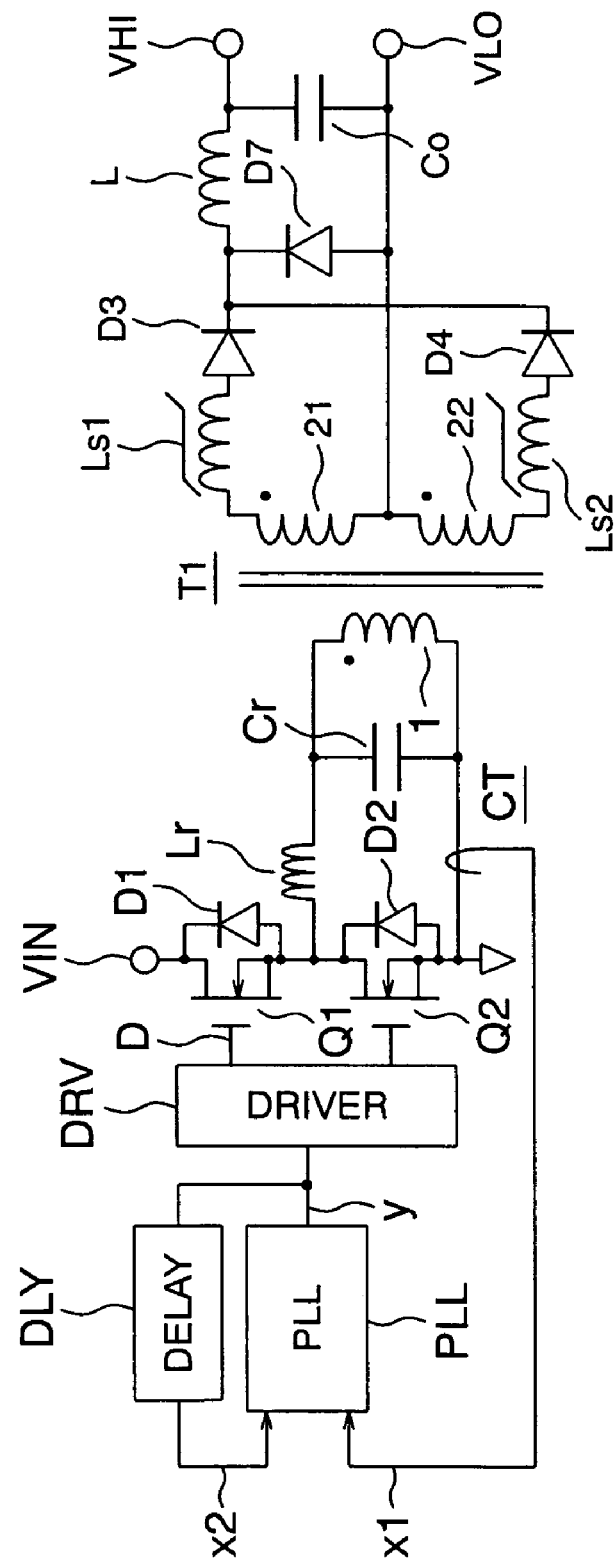
FIG. 17 is a circuit arrangement of a resonant converter in accordance with a tenth embodiment of the present invention.

FIG. 17 is a circuit arrangement of a resonant converter in accordance with a tenth embodiment of the present invention. In the foregoing embodiments, explanation has been made in connection with the series-connected resonant converter wherein the capacitor Cr is connected in series with the load. FIG. 17 shows a parallel-connected resonant converter wherein the capacitor Cr is connected in parallel to the load. In the drawing, constituent elements having the same reference numerals or symbols as FIG. 1 denote the same elements. Even in such an arrangement, effects similar to the above cases can be obtained. FIG. 17 corresponds to the embodiment of FIG. 1, but can be similarly applied to the arrangements of the aforementioned embodiments.

In the present invention, an IGBT (Insulated Gate Bipolar Transistor) in place of the power MOS FET can be used as the main switching device for its realization. Although explanation has been on the assumption that the power MOS FET Q1 is of an NMOS type, the NMOS FET may be replaced by a PMOS FET for its realization.

In the foregoing explanation, the secondary winding of the transformer having the center tap is shown. However, the present invention is not limited to the above example, but may be applied, e.g., to an example of limited use of power corresponding to a half period with use of one winding, obtaining effects similar to the above.

The resonant converter of the present invention can be applied not only to the isolated power supply for a process input/output device in the computer control system, but also to a multioutput isolated power supply for use in information and communication equipment, electronic equipment, etc.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A resonant converter for converting a direct current to an alternating current as an alternating current output at a semiconductor switching device driven by a driving section, supplying the alternating current output to a primary side of a transformer via resonance circuit, and converting an alternating current flowing through a secondary side of the transformer to a direct current, said converter comprising:
    means for making an output frequency of said driving section for driving said semiconductor switching device track a resonant frequency of said resonance circuit or a frequency corresponding to 1/(odd number) thereof.

2. A resonant converter according to claim 1, wherein means for making the output frequency of said driving section track a resonant frequency of said resonance circuit or a frequency corresponding to 1/(odd number) thereof is provided with a PLL (Phase Locked Loop) circuit.

3. A resonant converter according to claim 1, wherein a saturable reactor is provided in the secondary side of said transformer.

4. A resonant converter according to claim 1, wherein a switching device to be driven by a voltage of the secondary side of said transformer is provided in the secondary side of said transformer.

5. A resonant converter according to claim 1, wherein switching means for switchingly converting a voltage of the secondary side of said transformer to a direct current, a smoothing filter connected to an output side of said switching means and including an inductor and a capacitor, a switching device connected with such a direction as to circulate a current flowing through said smoothing filter and/or a load, and means for driving said switching device during an off period of said switching means are provided in the secondary side of said transformer.

6. A resonant converter according to claim 1, comprising a synchronous rectification circuit provided with a center tap connected to the secondary side of said transformer and including a switching device, and means for performing PWM control over said switching device.

7. A resonant converter according to claim 1, comprising a plurality of secondary windings of said transformer and means for converting alternating voltages of the plurality of secondary windings to direct voltages respectively.

8. A resonant converter according to claim 1, wherein said converter comprises a plurality of transformers, and said common semiconductor switching device and said resonance circuit are connected to primary sides of said plurality of transformers to convert alternating currents flowing through secondary sides of said plurality of transformers to a plurality of direct currents and to output a plurality of direct voltages respectively.

9. A resonant converter according to claim 1, wherein said means for making the output frequency of said driving section for driving said semiconductor switching device track the resonant frequency of said resonance circuit is arranged to track a frequency corresponding to ⅓ of said resonant frequency.

10. A resonant converter for converting a direct current to an alternating current as an alternating current output at a semiconductor switching device driven by a driving section, supplying the alternating current output to a primary side of a transformer via resonance circuit, and converting an alternating current flowing through a secondary side of the transformer to a direct current, said converter comprising:

means for making an output frequency of said driving section for driving said semiconductor switching device track a resonant frequency of said resonance circuit or a frequency corresponding to 1/(odd number) thereof, and means for generating the output signal of said driving section with a phase leading a zero-cross point of the resonance current of said resonance circuit.

11. A resonant converter according to claim 10, comprising a PLL (Phase Locked Loop) circuit for outputting a frequency made to track the resonant frequency of said resonance circuit or a frequency corresponding to 1/(odd number) thereof, and a delay element provided in a feedback loop of said PLL circuit; and wherein said switching device is driven on the basis of an output signal of said PLL circuit.

12. A resonant converter according to claim 10, wherein a saturable reactor is provided in the secondary side of said transformer.

13. A resonant converter according to claim 10, wherein a switching device driven by a voltage of the secondary side of said transformer is provided in the secondary side of said transformer.

14. A resonant converter according to claim 10, wherein switching means for switchingly converting a voltage of the secondary side of said transformer to a direct voltage, a smoothing filter connected to an output side of said switching means and including an inductor and a capacitor, a switching device connected in such a direction as to circulate a current flowing through said smoothing filter and/or a load, and means for driving said switching device during an off period of said switching device are provided in the secondary side of said transformer.

15. A resonant converter according to claim 10, comprising a synchronous rectification circuit provided with a center tap connected to the secondary side of said transformer and including a switching device, and control means for performing PWM control over said switching device.

16. A resonant converter according to claim 10, comprising a plurality of secondary windings of said transformer and means for converting alternating voltages of said plurality of secondary windings to direct voltages respectively.

17. A resonant converter according to claim 10, wherein said converter comprises a plurality of transformers, and said semiconductor switching device and said resonance circuit are commonly connected to primary sides of said plurality of transformers to convert alternating currents flowing through secondary sides of said plurality of transformers to a plurality of direct currents and to output a plurality of direct voltages respectively.

18. A resonant converter according to claim 10, wherein said means for making the operating frequency of said driving section for driving said semiconductor switching device track the resonant frequency of said resonance circuit is arranged to track a frequency corresponding to ⅓ of said resonant frequency.

19. A method of controlling a resonant converter for converting a direct current to an alternating current as an alternating current output at a semiconductor switching device driven by a driving section, supplying the alternating current output to a primary side of a transformer via resonance circuit, and converting an alternating current flowing through a secondary side of the transformer to a direct current, said method comprising the step of:

making an output frequency of said driving section for driving said semiconductor switching device track a resonant frequency of said resonance circuit or a frequency corresponding to 1/(odd number) thereof.

20. A method according to claim 19, wherein the output signal of said driving section is generated with a phase leading a zero-cross point of the resonance current of said resonance circuit.

* * * * *